(12) United States Patent
Shaw et al.

(10) Patent No.: US 6,420,003 B2
(45) Date of Patent: Jul. 16, 2002

(54) ACRYLATE COMPOSITE BARRIER COATING

(75) Inventors: David G. Shaw; Eric Dawson; Daniel Cline; Marc Langlois, all of Tucson, AZ (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/745,083

(22) Filed: Dec. 20, 2000

Related U.S. Application Data

(63) Continuation of application No. 08/706,180, filed on Aug. 30, 1996, now Pat. No. 6,231,939, which is a continuation of application No. 08/228,579, filed on Apr. 15, 1994, now abandoned, which is a continuation of application No. 08/131,328, filed on Oct. 4, 1993, now Pat. No. 5,440,446.

(51) Int. Cl.[7] .......................... B29D 22/00; B32B 27/30
(52) U.S. Cl. ................... 428/35.9; 428/35.3; 428/35.8; 428/215; 428/216; 428/336; 428/451; 428/463; 428/475.8; 428/476.3; 428/483; 428/520; 428/522
(58) Field of Search .............................. 428/35.3, 35.8, 428/35.9, 215, 216, 448, 450, 451, 520, 522, 336, 463, 475.8, 476.3, 483

(56) References Cited

U.S. PATENT DOCUMENTS

| | | | |
|---|---|---|---|
| 2,632,921 A | 3/1953 | Kreidl | 18/47.5 |
| 3,250,638 A | 5/1966 | Lassiter | 127/537 |
| 3,334,002 A | 8/1967 | Heywang | 156/233 |
| 3,347,697 A | 10/1967 | Gmitro | 117/46 |
| 3,549,406 A | 12/1970 | Ambusk | 117/34 |
| 3,654,532 A | 4/1972 | Rayburn | 317/258 |
| 3,855,507 A | 12/1974 | Hoyler | 317/258 |
| 3,914,471 A | 10/1975 | Cobb et al. | 427/250 |
| 3,984,608 A | 10/1976 | Optiz | 428/432 |

(List continued on next page.)

FOREIGN PATENT DOCUMENTS

| | | |
|---|---|---|
| JP | 57-30769 | 2/1982 |
| JP | 60-112421 | 6/1985 |

OTHER PUBLICATIONS

Optical Interference Coatings for Inhibiting of Counterfeiting, *Optica Acta*, 1973, vol. 20, N. 12, pp. 925–937.

*Primary Examiner*—D. S. Nakarani
(74) *Attorney, Agent, or Firm*—Melanie Gover

(57) ABSTRACT

A thermoplastic container or packaging material is given low oxygen permeability by coating with a crosslinked acrylate layer and a layer of oxygen barrier material deposited over the acrylate layer. Another acrylate layer may be deposited over the oxygen barrier. The oxygen barrier is selected from the group consisting of silicon oxide, aluminum oxide and metal. The acrylate layer may be formed from a photopolymerizable polyfunctional acrylate that is sufficiently low viscosity to be sprayed on the substrate or applied by dipping. Alternatively, the acrylate layer is a polymerization product of an acrylate monomer which is evaporated in a vacuum, condensed on the substrate and polymerized by irradiation by ultraviolet or an electron beam. The surface of the thermoplastic substrate is prepared for deposition of the acrylate by either flame treating the surface of the substrate to heat it above its melting point without deforming the substrate to thereby smooth the surface, or by plasma treating the surface for enhancing adhesion of the acrylate. Chilling the substrate enhances deposition efficiency.

24 Claims, 2 Drawing Sheets

U.S. PATENT DOCUMENTS

| | | | |
|---|---|---|---|
| 3,993,811 A | 11/1976 | Walles | 428/35 |
| 4,197,129 A | 4/1980 | Muroi et al. | 430/625 |
| 4,218,294 A | 8/1980 | Brack | 204/159.13 |
| 4,229,523 A | 10/1980 | Ohta et al. | 430/532 |
| 4,229,777 A | 10/1980 | Merrill et al. | 361/314 |
| 4,241,129 A | 12/1980 | Marton et al. | 428/216 |
| 4,320,437 A | 3/1982 | Shaw et al. | 361/303 |
| 4,468,412 A | 8/1984 | Fujii et al. | 427/536 |
| 4,490,774 A | 12/1984 | Olson et al. | 361/311 |
| 4,499,520 A | 2/1985 | Cichanowski | 361/311 |
| 4,513,349 A | 4/1985 | Olson et al. | 361/311 |
| 4,515,931 A | 5/1985 | Olson et al. | 526/323.2 |
| 4,533,710 A | 8/1985 | Olson et al. | 526/323.2 |
| 4,557,944 A | 12/1985 | Arai et al. | 127/537 |
| 4,584,628 A | 4/1986 | Cichanowski | 361/309 |
| 4,586,111 A | 4/1986 | Cichanowski | 361/323 |
| 4,613,518 A | 9/1986 | Ham et al. | 427/38 |
| 4,618,911 A | 10/1986 | Cichanowski et al. | 361/308 |
| 4,647,818 A | 3/1987 | Ham | 315/111.21 |
| 4,682,565 A | 7/1987 | Carrico | 118/719 |
| 4,686,112 A | 8/1987 | Hoffman | 427/42 |
| 4,696,719 A | 9/1987 | Bischoff | 202/205 |
| 4,722,515 A | 2/1988 | Ham | 261/142 |
| 4,728,701 A | 3/1988 | Jarvis et al. | 526/65 |
| 4,842,893 A | 6/1989 | Yializis et al. | 127/537 |
| 4,876,113 A | 10/1989 | Yasunaga et al. | 127/537 |
| 4,888,237 A | 12/1989 | Balloni et al. | 428/347 |
| 4,919,985 A | 4/1990 | Asai et al. | 428/36.6 |
| 4,954,371 A | 9/1990 | Yializis | 427/44 |
| 4,980,200 A | 12/1990 | Takahashi et al. | 427/223 |
| 5,018,048 A | 5/1991 | Shaw et al. | 361/323 |
| 5,021,298 A | 6/1991 | Revell | 428/458 |
| 5,032,461 A | 7/1991 | Shaw et al. | 428/461 |
| 5,077,104 A | 12/1991 | Hunt et al. | 428/34.3 |
| 5,097,800 A | 3/1992 | Shaw et al. | 118/730 |
| 5,108,780 A | 4/1992 | Pitt et al. | 427/538 |
| 5,112,462 A | 5/1992 | Swisher | 427/537 |
| 5,114,739 A | 5/1992 | Culbertson et al. | 427/40 |
| 5,280,084 A | 1/1994 | Paul | 525/375 |
| 5,364,666 A | 11/1994 | Williams et al. | 427/579 |
| 5,376,400 A | 12/1994 | Goldberg et al. | 427/2.24 |
| 5,403,626 A | 4/1995 | Kim et al. | 427/536 |
| 5,440,446 A | 8/1995 | Shaw et al. | 361/301.5 |
| 5,512,324 A | 4/1996 | Paulus et al. | 427/409 |
| 5,512,338 A | 4/1996 | Bianchini et al. | 428/35.4 |
| 5,571,574 A | 11/1996 | Misiano et al. | 427/537 |

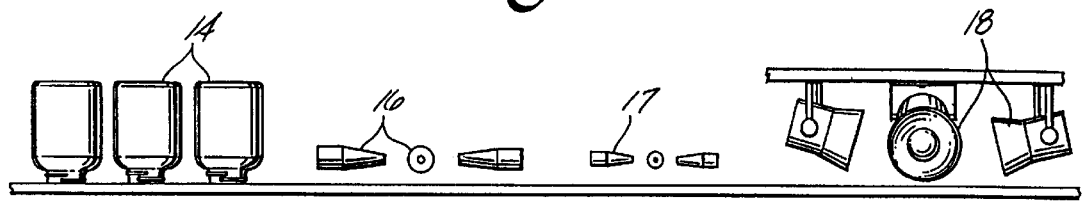
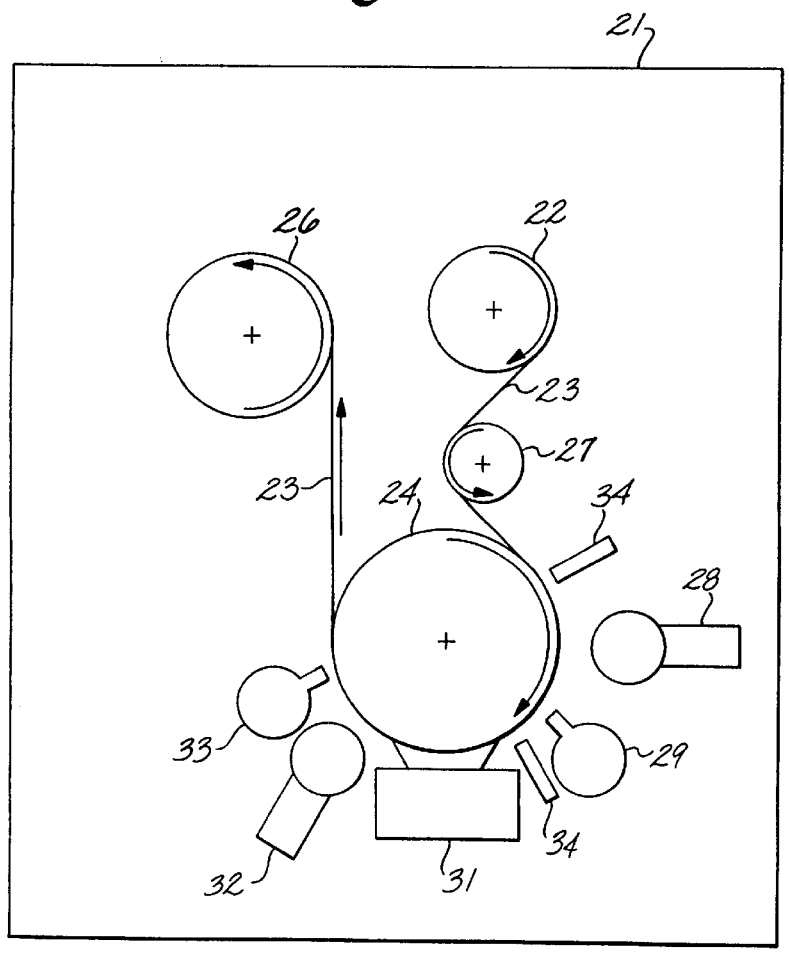

ACRYLATE COMPOSITE BARRIER COATING

CROSS REFERENCE TO RELATED APPLICATIONS

This application is a continuation of application Ser. No. 08/706,180 filed Aug. 30, 1996, now U.S. Pat. No. 6,231,939 B1, which is a continuation of application Ser. No. 08/228,579 filed Apr. 15, 1994, now abandoned, which is a continuation of application Ser. No. 08/131,328 filed Oct. 4, 1993 and now U.S. Pat. No. 5,440,446 issued Aug. 8, 1995. The subject matter of these applications are incorporated herein by reference.

BACKGROUND OF THE INVENTION

This invention relates to deposition of barrier films for inhibiting penetration by oxygen or other gases employing a cross-linked acrylate layer and a layer of oxygen barrier material.

Many products, including many food products, are packaged in thin plastic sheet bags or the like. The thin films are desirably resistant to permeation by oxygen, water vapor and odorous gases. This can, for example, be important for protecting a food from environmental gases and also for retaining the aroma of food as it is stored.

Such barrier films are commonly made of costly plastics because less costly films are too permeable to oxygen or water to give a long shelf life. Reduced cost barrier films are highly desirable.

There are many products that are packaged in plastic bottles, tubes or vials which also need protection from oxidation or contamination by environmental gasses or which must be in impermeable containers so that components of the contents are not lost by diffusion through the containers. An example comprises medical products which may presently be enclosed in glass bottles because plastics are not suitable. It would be desirable to make such containers of plastic material which is physiologically acceptable, however, such materials may also be sufficiently permeable to oxygen that they are unsuitable for medical products. Food packages are also desirably packaged in plastic, but shelf life may be compromised by permeability. It is, therefore, desirable to provide a coating on such vessels for these critical applications.

SUMMARY OF THE INVENTION

There is, therefore, provided in practice of this invention a barrier with low oxygen and water permeability having a thermoplastic substrate, a cross-linked acrylate layer on one face of the substrate and a layer of oxygen barrier material deposited on the same face of the substrate as the acrylate layer, preferably over the acrylate layer, or in some embodiments, under the acrylate layer. In one embodiment, the acrylate layer is a polymerization product of an acrylate monomer having a molecular weight in the range of from 150 to 600. Alternatively, the acrylate layer may be formed from a photopolymerizable acrylate that is sufficiently low viscosity to be sprayed on the substrate or applied by dipping. Preferably, there is another cross-linked acrylate layer over the oxygen barrier layer. It is preferable to deposit a top acrylate layer over a metallized layer before the metallized layer contacts any surfaces.

The surface of the thermoplastic substrate is prepared for deposition of the acrylate by either heating the surface of the substrate above its melting point without deforming the substrate or by plasma treating the surface for enhancing adhesion of the acrylate. Chilling the substrate enhances deposition efficiency.

DESCRIPTION OF THE DRAWINGS

These and other features and advantages of the present invention will be appreciated as the same becomes better understood by reference to the following detailed description when considered in connection with the accompanying drawings wherein:

FIG. 3 is a schematic illustration of apparatus for coating substrates by spraying; and FIG. 4 is a schematic illustration of apparatus for coating a sheet substrate.

DESCRIPTION OF THE INVENTION

Figure 1:
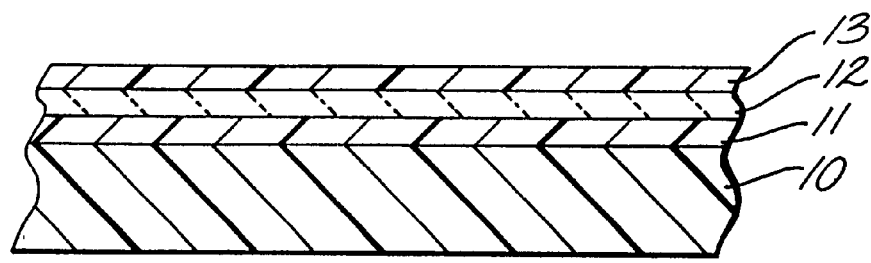
FIG. 1 illustrates in transverse cross section a coated thermoplastic substrate with low oxygen permeability.
Figure 2:
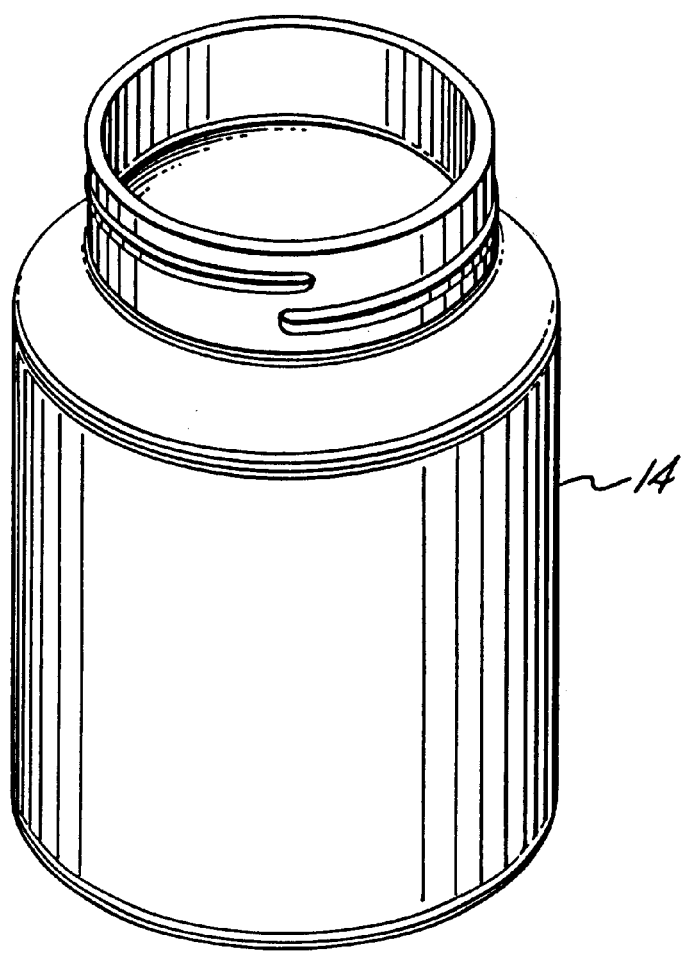
FIG. 2 illustrates an exemplary container constructed according to principles of this invention.

An exemplary barrier material constructed according to principles of this invention comprises a thermoplastic substrate having a cross-linked acrylate layer 11 on one face. The acrylate layer is overlain by a layer 12 of oxygen barrier material. A final cross-link acrylate layer 13 is optionally formed over the oxygen barrier layer.

It will be recognized that in the drawing, the various layers are drawn schematically and at a scale suitable for illustration rather than at the scale of the actual material. For example, such a composite with low oxygen permeability may be a wall of a four ounce threaded bottle 14 with a wall thickness of about 1 mm. Thus, the substrate has a thickness of 1 mm. The thickness of each of the layers formed on such a substrate may be in the order of 1 micrometer or less. An acrylate layer may be somewhat thicker if sprayed on and up to about 25 micrometers if applied by dipping. If one is making thin sheet material for food packaging or the like, the substrate thickness may be in the order of 5 to 20 micrometers with the coating layers being in the order of 1 micrometer or less.

It has been discovered that polyethylene, polypropylene, polyester or nylon substrates with thin surface coatings of crosslinked acrylate have very low oxygen and water permeability when combined with a metal or inorganic barrier coating. There is a great need for low cost packaging materials where the oxygen permeability of the package is low for preserving the freshness of the packaged goods. Metallized plastic sheet is used for this purpose. Typical sheets for packaging foodstuffs include metallized polypropylene, nylon or polyester sheet. Metallized nylon has an oxygen permeability of about 0.05 ml/100 in$^2$/hour (ml/645 cm$^2$/hour) as measured with a Mocon Oxtran System available from Modern Controls, Minneapolis, Minn. Metallized polyester has a typical oxygen permeability of about 0.08. Metallized polypropylene, on the other hand, has an oxygen permeability of about 2.5 and is not usually suitable for packaging where low oxygen permeability is important.

It is believed that the high oxygen permeability of metallized polypropylene is due to the inherent surface roughness of the polypropylene sheet. Nylon and polyester sheets are considerably smoother and have a higher temperature capability than polypropylene. A metal coating of uniform thickness can be readily applied as a good oxygen barrier. Typically, polypropylene may have a surface roughness in the order of ½ to one micrometer, or more in some sheets. A layer of acrylate in the same order, namely about ½ to one micrometer thick is adequate for smoothing the surface for producing a low oxygen permeability.

Sheet polypropylene without any coating may have an oxygen permeability of about 100. However, if a layer of aluminum is applied to a surface of a polypropylene sheet substrate, the oxygen permeability decreases to about 2.5. Surprisingly, when an acrylate layer only about one micrometer thick is formed on the polypropylene and then covered with a layer of metal, the oxygen permeability drops to about 0.05, a value lower than metallized polyester. It is hypothesized that the film of liquid acrylate monomer deposited on the surface of the polypropylene has a smooth, high temperature surface and the surface remains smooth when the acrylate is polymerized. The metallized layer can then form a good oxygen barrier.

Furthermore, a transparent barrier film may be formed on a polyethylene, polypropylene, polyester or nylon substrate, or other thermoplastic substrate. First, a layer of acrylate monomer is deposited on the substrate and crosslinked. The acrylate layer is then coated with an oxygen barrier layer of $SiO_x$ or $Al_2O_3$, both of which have good resistance to oxygen permeability. The high temperature resistance of the crosslinked acrylate layer permits the notably higher temperature deposition of silicon oxide or aluminum oxide on the thermoplastic substrate.

A still greater surprise occurs when another polymerized acrylate layer is formed over the oxygen barrier layer. The permeability through a polypropylene barrier material drops to about 0.002 which is appreciably better than the oxygen permeability of metallized nylon. It is hypothesized that the second acrylate layer may protect the metallized layer and assure retention of the oxygen barrier properties of the metal. Oxygen barriers are further enhanced by multiple layers, such as, for example, a thermoplastic substrate with layers of acrylate, metal, acrylate, metal and acrylate. Furthermore, when multiple coating layers are applied, any pinholes or other local defects in a layer are likely to be offset from similar pinholes or defects in underlying layers. Thus, oxygen permeability through pinholes is effectively eliminated.

Thus, a preferred composite material with low oxygen permeability has a layer of polymerized acrylate, a layer of barrier material such as $SiO_x$ or $Al_2O_3$ and another layer of polymerized acrylate on a thermoplastic substrate. The layers of acrylate reduce permeability dramatically and the layer overlying the barrier material protects the barrier material from mechanical damage and also provides a surface suitable for printing.

The substantial improvement in oxygen permeability is believed to be attributable to formation of a liquid film of monomer on the surface of the polypropylene, followed by cross linking of the polyfunctional acrylate. Applying the layer by condensing or spraying as a liquid assures smooth and uniform coating of the substrate, thereby forming an excellent surface for receipt of the metallization. Cross linking upon curing the acrylate produces a material having low inherent oxygen permeability. Adding a second layer of acrylate monomer which is polymerized in situ is believed to rectify any defects in the underlying layers and provide an additional thickness of material with inherently low oxygen permeability. Redundant layers minimize pinhole leakage.

The polymerized acrylate layer is believed to be beneficial for a number of other reasons. As a thermoset material, it has higher temperature resistance than the thermoplastic substrate. In the coating process, the product is subjected to elevated temperature processing such as metallizing, plasma treatment and the like. Particularly high temperatures may be encountered when depositing transparent barrier coatings. Various volatile materials, such as water vapor or plasticizers, may be emitted by thermoplastic surfaces under these conditions. These may adversely affect the properties of the coating such as adhesion, nucleation and growth, and thereby reduce the barrier properties. A cured acrylate coating would not have such emissions and may seal the surface and inhibit emission of such materials from a thermoplastic substrate.

The acrylate layers in the various embodiments may be deposited by either of two principal techniques. One may spray a low viscosity liquid acrylate onto the surface in an open system or a container may simply be dipped into a liquid acrylate. Alternatively, one may condense a vaporized acrylate monomer in a vacuum system.

It is particularly preferred to vaporize an acrylate prepolymer and deposit it on a substrate in a vacuum system since this technique serves to refine the acrylate. the original polyfunctional acrylate may contain volatile non-polymerizable substances that are preferably avoided in the crosslinked coating. In effect, the vaporization and deposition process is a vacuum distillation which removes volatiles to the vacuum pumps and deposits only higher molecular weight acrylates on the substrate. Removal of volatiles is desirable for subsequent high temperature processing of the material such as in deposition of metal or other inorganic barrier films.

After any of these deposition techniques, the monomer film is irradiated with ultraviolet or an electron beam to cause polymerization of the acrylate to form a monolithic crosslinked layer. Polymerization by irradiation is a conventional practice and the electron flux required or wavelength and total flux of ultraviolet used are commonly known. A photoinitiator may be included in the acrylate for facilitating polymerization by ultraviolet radiation.

An exemplary process for coating a container can be described as follows. Such a container may be a food jar, a beverage bottle, a collapsible tube, a cosmetic container, a medicine bottle, a vial for blood products, or essentially any other thermoplastic container. The container is injection molded or blow molded in a conventional manner from a conventional thermoplastic material. Preferably the container is then flame treated for activating and smoothing the surface. It has been found that adhesion of an acrylate layer on the substrate is enhanced by activating the surface by plasma or flame treating. High temperature air may also be used.

In a typical production line, a row of containers 14 are moved successively through a flame treating station, a coating station and a curing station. In the flame treating station, the containers are bathed in the flames from a plurality of propane or natural gas torches 16. The containers may be rotated as they pass through the flame treating station for uniform heating of the surfaces or they may be essentially fixed and have a plurality of torches arranged for completely surrounding the container.

In addition to activating the surface for enhanced adhesion, the flame treating can significantly smooth the surface of the container to assure that there is complete coverage by subsequent coatings. The thermoplastic materials employed for such containers have a relatively low thermal conductivity. The flame is applied to the surface with sufficient intensity to soften or melt a thin surface layer on the container. The containers move through the flame treating station rapidly enough, however, that the container is not deformed by the heating.

The flame treatment melts and rounds off any molding flash and smooths mold marks on the container so that the coating can bridge surface irregularities. "Melting" may almost be considered a misnomer since the thermoplastic materials are effectively supercooled liquids. Thus, melting is considered to be sufficient softening of the surface for smoothing irregularities. Furthermore, there may be embodiments where the quality of the mold in which the container is made may be good enough that smoothing is not a significant requirement. In such a case, flame treatment may still be employed with sufficient intensity for activating the surface and enhancing adhesion of a subsequent acrylate layer without noticeable melting.

Such an acrylate layer is applied in a coating station where one or more nozzles 17 sprays a thin coating of acrylate monomer onto the surface. Such a sprayed coating may be in the order of from one to twenty micrometers thick, for example. The acrylate sprayed onto the surface may be a low viscosity monomer or if desired, a monomer and/or a low molecular weight polymer may be combined with a solvent for spraying. In the event the acrylate is to be cross-linked by ultraviolet irradiation, a photoinitiator may be included in the sprayed composition.

An alternative to spraying the surface of the container with acrylate comprises dipping the container into a liquid acrylate composition. In one exemplary embodiment, such dipping of a container yields an acrylate coating thickness of up to about 25 micrometers.

Following the coating station, the containers pass a curing station where a plurality of ultraviolet lamps 18 irradiate the acrylate layer and cause cross-linking.

Following the application of an acrylate layer to the containers, an oxygen barrier layer is applied. Preferably this is by deposition in a vacuum chamber. A metal barrier layer, e.g. aluminum, may be applied by vacuum metallizing or sputtering. A layer of silicon oxide or aluminum oxide or other oxide material may be deposited by a plasma assisted chemical vapor deposition technique. For example, $SiO_x$ may be deposited by a plasma vapor deposition process using an oxidizing or inert carrier gas. $SiO_x$ may be evaporated from a crucible by an electron beam and deposited over the acrylate layer on the thermoplastic container. Preferably this is conducted in an oxygen rich environment for obtaining the proper composition of the $SiO_x$. Aluminum oxide can be deposited by electron beam evaporation or preferably by evaporation of aluminum which is converted to an oxide in an oxygen plasma.

Other conventional techniques for depositing silica, alumina or other oxides may be used. A variety of techniques are used in the semiconductor industry, but may have deposition temperatures too high for coating thermoplastics which are not already coated with a protective layer of crosslinked acrylate.

An alternative technique for depositing an acrylate layer is in a vacuum chamber. Suitable apparatus for coating a sheet substrate with acrylate and oxygen barrier layers is illustrated schematically in FIG. 4. All of the coating equipment is positioned in a conventional vacuum chamber 21. A roll of polypropylene, polyester or nylon sheet is mounted on a pay-out reel 22. The sheet 23 forming the substrate is wrapped around a rotatable drum 24 and fed to a take-up reel 26. Idler rolls 27 are employed, as appropriate, for guiding the sheet material from the payout reel to the drum and to the take-up reel.

A flash evaporator 28 is mounted in proximity to the drum at a first coating station. The flash evaporator deposits a layer or film of acrylate monomer on the substrate sheet as it travels around the drum. After being coated with acrylate monomer the substrate sheet passes an irradiation station where the acrylate is irradiated by a source 29 such as an electron gun or source of ultraviolet radiation. The UV radiation or electron bombardment of the film induces polymerization of the acrylate monomer.

The sheet then passes a deposition station 31 where a coating of oxygen barrier material is applied by plasma deposition, vacuum deposition or the like. The sheet then passes another flash evaporator 32 where another layer of acrylate monomer is deposited for forming a protective layer over the oxygen barrier. This layer of monomer is cured by irradiation from an ultraviolet or electron beam source 33 adjacent the drum. The coated sheet is then wrapped up on the take-up reel 26.

Evaporation of the monomer is preferably from flash evaporation apparatus 29, 32 as described in U.S. Pat. Nos. 4,722,515, 4,696,719, 4,842,893, 4,954,371 and/or 5,097,800. These patents also describe polymerization of acrylate by radiation. In such flash evaporation apparatus, liquid acrylate monomer is injected into a heated chamber as 1 to 50 micrometer droplets. The elevated temperature of the chamber vaporizes the droplets to produce a monomer vapor. The monomer vapor fills a generally cylindrical chamber with a longitudinal slot forming a nozzle through which the monomer vapor flows. A typical chamber behind the nozzle is a cylinder about 10 centimeters diameter with a length corresponding to the width of the substrate on which the monomer is condensed. The walls of the chamber may be maintained at a temperature in the order of 200 to 320° C.

Two styles of evaporator are suitable. In one of them, the orifice for injecting droplets and flash evaporator are connected to one end of the nozzle cylinder. In the other style, the injector and flash evaporator section is attached in the center of the nozzle chamber like a T.

It is often found desirable to plasma treat the surface to be coated immediately before coating. A conventional plasma gun 34 is positioned in the vacuum chamber upstream from each of the flash evaporators 28 and 32 for activating the surface of the sheet on a continuous basis before monomer deposition. Conventional plasma, generators are used. In an exemplary embodiment the plasma generator is operated at a voltage of about 500 to 1000 volts with a frequency of about 50 Khz. Power levels are in the order of 500 to 3000 watts. For an exemplary 50 cm wide film traveling at a rate of 30 to 90 meters per minute, around 500 watts appears appropriate. Plasma treatment of the surface enhances adhesion of the deposited materials.

An analogous system may be employed for coating containers with layers of acrylate and barrier material. In the event the containers are coated with acrylate external to a vacuum system, the coated containers are placed in or moved through a deposition station in a vacuum chamber for depositing an oxygen barrier material by plasma assisted chemical vapor deposition or the like. In the event both acrylate and oxygen barrier materials are applied in the vacuum system, the containers are moved successively through an acrylate evaporation and condensation station and a deposition station. If two layers of acrylate are used, over and under the oxygen barrier layer, the second acrylate may be applied by way of the same flash evaporator or by way of a second similar flash evaporator. Plasma treatment of the surface of the container is optional. If the container has been flame treated a short interval before it is introduced into the vacuum chamber, the surface probably remains sufficiently activated for good adhesion of the acrylate layer and plasma treatment may not be of any additional benefit.

The acrylates used for forming the cross-linked coatings on the thermoplastic substrate differs somewhat depending on the technique used for depositing the coating. The acrylates used for dipping or spraying are similar and it is not necessary that the acrylate is a monomer. Generally, the acrylates used are blends of high and low molecular weight materials to yield the desired viscosity of the composition for dipping or spraying. Monomers with molecular weights in the order of 150 up to partially polymerized materials have a molecular weights in the order of 20,000 may be blended to obtain a low viscosity blend. The chemistry of the acrylates is not known to be significant. There should, however, be polyfunctional acrylates in the blend so that there is extensive cross-linking. There should be a minimum of at least about 20% diacrylate or equivalent.

In the event the acrylate layers are applied by the evaporation and condensation technique, the range of suitable acrylates is more restricted. These acrylate resins are generally monomers having a molecular weight in the range of from 150 to 600. Preferably, the monomers have a molecular weight in the range of from 200 to 400. Higher molecular weight fluorinated acrylates or methacrylates may be equivalent to these lower molecular weight materials and also be used for forming a deposited acrylate layer. For example, a fluorinated acrylate with a molecular weight of about 2000 evaporates and condenses similar to a non-fluorinated acrylate having a molecular weight in the order of 300. The acceptable range of molecular weights for fluorinated acrylates is about 400 to 3000. Fluorinated acrylates include monoacrylates, diacrylates, and methacrylates. Fluorinated methacrylates are fast curing. Whereas methacrylates are generally too slow curing to be desirable, the fluorinated methacrylates cure rapidly. Chlorinated acrylates may also be useful.

If the molecular weight is below about 150, the monomer is too volatile and does not condense well for forming a monomer film. Monomer that does not condense on the desired substrate may foul vacuum pumps and hinder operation of an electron gun used for polymerizing the resin. If the molecular weight is more than about 600 the monomer does not evaporate readily in the flash evaporator at temperatures safely below the decomposition temperature of the monomer.

It is desirable that the thickness of the acrylate layer be sufficient for smoothing any surface roughness of the underlying substrate. For example, polypropylene which has not been flame treated may have a surface roughness in the order of ½ to one micrometer. A layer of acrylate in the same order, namely about ½ to one micrometer thick is adequate for smoothing the surface.

In applications where a transparent oxygen barrier is applied or in some applications with a metallized layer, a thin layer of acrylate shows a slightly colored or tinted appearance due to interference patterns. An acrylate layer having a thickness of about 1.2 to 1.5 micrometers can avoid the interference colors.

Suitable acrylates not only have a molecular weight in the appropriate range, they also have a "chemistry" that does not hinder adhesion. Generally, more polar acrylates have better adhesion to metal layers than less polar monomers. Long hydrocarbon chains may hinder adhesion to metal but may be an advantage for depositing on non-polar thermoplastic or oxide surfaces. For example, lauryl acrylate has a long chain that is hypothesized to be aligned away from the substrate and may hinder adhesion to subsequent layers. Thus, one acrylate monomer or blend may be used for condensing acrylate on a thermoplastic substrate, and a different acrylate may be used for depositing over the oxygen barrier layer.

A typical monomer used for flash evaporation includes an appreciable amount of diacrylate and/or triacrylate to promote crosslinking. Blends of acrylates may be employed for obtaining desired evaporation and condensation characteristics and adhesion, and for controlled shrinkage of the deposited film during polymerization.

Suitable monomers are those that can be flash evaporated in a vacuum chamber at a temperature below the thermal decomposition temperature of the monomer and below a temperature at which polymerization occurs in less than a few seconds at the evaporation temperature. The mean time of monomer in the flash evaporation apparatus is typically less than one second. Thermal decomposition, or polymerization are to be avoided to minimize fouling of the evaporation apparatus. The monomers selected should also be readily capable of crosslinking when exposed to ultraviolet or electron beam radiation.

The monomer composition may comprise a mixture of monoacrylates and diacrylates. Triacrylates tend to be reactive and may polymerize at the evaporation temperatures. Generally speaking, the shrinkage is reduced with higher molecular weight materials.

Generally, it is desirable that at least a major portion of the acrylate monomer evaporated is a polyfunctional acrylate for crosslinking. Preferably, the acrylate comprises at least 70 percent polyfunctional acrylates such as diacrylate or triacrylate. If the degree of crosslinking is too low, the polymerized acrylate layer may not have adequate cure speed.

Preferably, the molecular weight of the acrylate monomer is in the range of from 200 to 400. If the molecular weight is less than about 200, the monomer evaporates readily, but may not condense quantitatively on the substrate without chilling of the substrate. If the molecular weight is more than about 400, the monomers become increasingly difficult to evaporate and higher evaporation temperatures are required. As mentioned above, some fluorinated methacrylates with higher molecular weights are equivalent to lower molecular weight non-fluorinated acrylates.

Preferably, the acrylate monomer has a vapor pressure at 25° C. in the range of from 1 to 20 micrometers of mercury. If the vapor pressure is less than about one micrometer, exceptionally high temperatures may be required to evaporate sufficient material for forming a coating on the substrate in reasonable coating time. High temperatures may lead to thermal decomposition or premature curing of the monomers. If the vapor pressure is higher than about twenty micrometers of mercury, condensation of the monomer to form a film on the substrate may have too low an efficiency for practical coating operations. Adequate efficiency may not be obtained until the surface of the substrate is cooled below the freezing point of the monomer, in which case the material may not polymerize properly.

There are at least five monoacrylates, ten diacrylates, ten to fifteen triacrylates and two or three tetraacrylates which may be included in the evaporated composition. Most preferably the acrylate comprises hexane diol diacrylate (HDDA) with a molecular weight of 226 and/or tripropylene glycol diacrylate (TRPGDA) with a molecular weight of about 300. Other acrylates may be used, sometimes in combination, such as monoacrylates 2-phenoxy ethyl acrylate (M.W. 192), isobornyl acrylate (M.W. 208) and lauryl acrylate (M.W. 240), epoxy acrylate RDX80095 made by Radcure of Atlanta, Ga.; diacrylates diethylene glycol diacrylate (M.W. 214), neopentyl glycol diacrylate (M.W. 212), propoxylated neopentyl glycol diacrylate (M.W. 328) and polyethylene glycol diacrylate, tetraethylene glycol diacrylate (M.W. 302), and bisphenol A epoxy diacrylate; and triacrylates trimethylol propane triacrylate (M.W. 296), ethoxylated trimethylol propane triacrylate (M.W. 428), propylated trimethylol propane triacrylate (M.W. 470) and pentaerythritol triacrylate (M.W. 298). Monomethacrylates isobornyl methacrylate (M.W. 222) and 2-phenoxyethyl methacrylate (M.W. 206) and dimethacrylates triethylene glycol dimethacrylate (M.W. 286) and 1,6-hexanediol dimethacrylate (M.W. 254) may also be useful, but may cure too slowly to be useful for high speed coating operations.

It is known that adhesion may be enhanced between a substrate and an acrylate coating, by using an acrylate containing high molecular weight components. In practice very high molecular weight oligomers are usually mixed with low molecular weight monomers. The oligomers usually have molecular weights of greater than 1000 and often as large as 10,000 or even higher. The monomers are used as diluents to lower the coating viscosity and provide an increased number of acrylate groups for enhancing cure speed, hardness and solvent resistance in the resulting coating.

It has generally been considered that it is not feasible to evaporate high molecular weight acrylates because of their very low vapor pressure and high viscosity. Evaporated acrylate coatings have been restricted to low molecular weight monomers, generally below a molecular weight of about 400 and with low viscosity. Generally the viscosities are below 50 centistoke. For example, Henkel 4770, which is an amine acrylate, has a sufficiently high molecular weight that it has a viscosity of about 1000 centistokes at 25° C. This material cures in the evaporator before evaporating. Beta carboxy ethyl acrylate (BCEA) which has a viscosity of over 200 centistokes also cures in the evaporator.

It has been found, however, that by mixing a very low and a very high viscosity material, flash evaporation, condensation and curing can be obtained. For example, a mixture of 70 percent of Henkel 4770 and 30 percent diethylene glycol diacrylate has a viscosity of about 12 centistokes and can be successfully evaporated, condensed and cured. A mixture of 70 percent tripropylene glycol diacrylate (TRPGDA) and 30 percent of beta carboxy ethyl acrylate (BCEA) has a viscosity of about 15 centistokes and can be readily evaporated, condensed and cured. The low viscosity component lowers the viscosity of the blend, which improves atomization in the evaporator and assists in the flash evaporation of the high viscosity acrylate.

There is essentially a trade off between the molecular weights (and hence viscosities) of the high and low molecular weight acrylates. Generally, the lower the molecular weight and viscosity of the low molecular weight component, the higher the molecular weight and viscosity of the higher molecular weight component can be for satisfactory evaporation and condensation. The reason for good atomization in the flash evaporator is straightforward. This is essentially a physical effect based on the viscosity of the blend. The reason for successful evaporation is not as clear. It is hypothesized that the low molecular weight acrylate essentially dilutes the high molecular weight material and energetic evaporation of the lower molecular weight material effectively sweeps along the higher molecular weight material.

When blends of high and low molecular weight acrylates are used, it is preferred that the weighted average molecular weight of the blend be in the range of from 200 to 600 and preferably up to about 400. This assures that there is good vaporization of the blend at reasonable temperatures in the evaporator.

Some examples of low molecular weight acrylates are hexane diol diacrylate, diethylene glycol diacrylate, propane diacrylate, butane diol diacrylate, tripropylene glycol diacrylate, neopentyl glycol diacrylate, phenoxyethyl acrylate, isobornyl acrylate and lauryl acrylate. Some examples of high molecular weight acrylates are bisphenol A diacrylate, BCEA, Radcure 7100 (an amine acrylate available from Radcure, Atlanta Ga.), Radcure 169, Radcure 170, acrylated and methacrylated phosphoric acid, Henkel 4770 (an amine acrylate available from Henkel Corporation, Ambler, Pa.) and glycerol propoxy triacrylate.

Particularly preferred high molecular weight materials include BCEA which is acid in character and has a shrinkage of only about 4 percent upon curing. Another suitable material is an acrylate or methacrylate of phosphoric acid. One can also use acrylic acid in the composition, along with dimers, trimers and tetrameres of acidic acrylates or methacrylates. For example, Henkel 4770 is polar and helps increase the cure speed and adhesion. In general, the higher molecular weight components are used to add flexibility, reduce shrinkage or provide some particular chemical characteristics such as acid or caustic resistance.

The molecular weight range of the acrylate may be extended by preheating the prepolymer before it is atomized into the vaporization chamber. The acrylate is injected into a vaporization chamber by way of an ultrasonically vibrating tip. Fine droplets of acrylate are generated, which impinge on the heated walls of the vaporizer. The preheating lowers the viscosity of the acrylate and makes it easier to obtain fine droplets that readily flash evaporate.

Preferably the acrylate prepolymer is preheated to a temperature above ambient temperature and lower than a temperature where the prepolymer polymerizes. If the acrylate is overheated it may commence to polymerize in the atomizer. Preheating to about 100° C. is found to significantly enhance the rate of vaporization. When the acrylate is preheated the substrate may be moved past the vaporizer more rapidly for a desired thickness of coating. Thus, preheating the acrylate increases production speed. As mentioned, it may also extend the molecular weight range of acrylates suitable for deposition. Even materials that are solid at room temperature may be vaporized and deposited after preheating above their melting temperature.

It has been found that the temperature of the substrate on which the monomer film is deposited can have a large influence on the efficiency of condensation. The effect of temperature depends on the particular monomer. Because the efficiency of condensation changes rather steeply in the general vicinity of ambient temperatures and since the flash evaporation and irradiation tend to raise the temperature of the substrate, it is desirable to refrigerate the substrate before it is placed in the vacuum chamber. Good condensation efficiency can be obtained with monomers having a molecular weight of at least 200 with the substrate cooled to temperatures in the range from 0 to 15° C.

A rack of containers to be coated can be removed from a refrigerator and placed in a vacuum chamber, pumped down and coated before the containers warm to unreasonably high temperatures. If desired, the containers may be precooled to a temperature well below the optimum temperature for deposition and the deposition step timed to occur when the containers have warmed to an optimum temperature.

The surface of a polypropylene or other thermoplastic substrate can also be activated before any of the coating steps described above by exposing the substrate to a corona discharge in air or nitrogen. Oxygen and nitrogen are apparently incorporated onto the surface and change the surface conductivity and surface tension, enhancing adhesion and the ability to cure the acrylate. Thus, the surface can be activated by corona discharge, flame treatment or plasma bombardment within the vacuum system.

There may be embodiments where it is sufficient to deposit an oxygen barrier layer directly on the substrate and apply an acrylate layer over the oxygen barrier material. For example, when the thermoplastic substrate has been flame treated to smooth the surface sufficiently that a thin oxygen barrier material can bridge over any surface irregularities, the oxygen barrier material may be deposited directly on the flame treated substrate. An acrylate layer may then be applied over the oxygen barrier material to protect the barrier and further reduce permeability.

It is found particularly desirable to provide a protective crosslinked acrylate coating over a deposited layer of metal such as aluminum. If an aluminum layer is applied to a sheet substrate which is rolled for later use or which is passed over a roller contacting the surface, the aluminum may be abraded off of higher asperities on the surface. A sheet coated with aluminum and not protected with an overlying crosslinked acrylate coating may have a pinhole density in the order of 1000 pinholes/cm$^2$. If one deposits an acrylate monomer and polymerizes the acrylate in situ to form a layer having a thickness of as little as 0.1 micrometer, the pinhole density through the aluminum layer can be maintained as low as 10 pinholes per cm$^2$.

It is important to deposit the liquid acrylate on the metal layer before the metal layer contacts any solid surface, such as another roll or even the opposite face of a sheet substrate. The acrylate should, of course, be polymerized for forming a crosslinked acrylate layer before the metal layer contacts any solid surface. The crosslinked acrylate has much better abrasion resistance than the metal and avoids damage during handling.

There are various advantages and disadvantages to the techniques for depositing an acrylate coating inside the vacuum chamber by evaporation and condensation or outside the vacuum chamber by spraying or dipping. When the entire process can be performed in vacuum, it can be essentially continuous by using loading and unloading airlocks or it can be a batch process. When the entire process is performed in vacuum, there is essentially no concern for particulate contamination which may be present when the process is performed in an open environment. In an embodiment where multiple layers of both acrylate and an oxygen barrier material may be desired, the alternating layers can be accumulated in vacuum without removing the containers or other substrate from the vacuum chamber.

The evaporation and condensation technique may require cooling of the containers, depending on the acrylate monomers used. Prechilling of the containers may not be convenient. Cooling of a sheet substrate on a chilled drum in the vacuum chamber can be less of a disadvantage.

Spraying or dipping may be advantageous since the process can be readily observed and controlled in an open environment. It is also inexpensive. There may, however, be a problem with particulate material unless the process is performed in a suitably clean area. Oxygen may tend to inhibit curing of the acrylate coating. Furthermore, unreacted photoinitiator remaining in the cured coating may be evolved during subsequent vacuum deposition of the oxygen barrier material. Which of the techniques selected for a given application will depend on such considerations.

Many modifications and variations in the coating of thermoplastic containers for low oxygen permeability will be apparent to those skilled in the art. For example, the sequence of coating operations and the coated substrate may be varied appreciably. A mix of steps may also be employed. For example, one may choose to first flame treat the containers, then condense and cure an acrylate in a vacuum chamber, followed by deposition of an oxygen barrier. A second layer of acrylate may be applied by dipping or spraying.

Thus, it will be understood that within the scope of the following claims this invention may be practiced otherwise than as specifically described.

What is claimed is:

1. A barrier sheet comprising:

a thermoplastic substrate;

a first vapor deposited, crosslinked acrylate layer on at least one face of the substrate, the acrylate layer being a polymerization product of a blend of acrylate monomers comprising at least one monomer having a molecular weight in the range of 150 to 600;

a substantially continuous layer of gas barrier material vacuum deposited over the acrylate layer; and a second vapor deposited acrylate layer over the gas barrier material which was crosslinked before the gas barrier material contacted any solid surface.

2. A barrier as recited in claim 1 wherein the gas barrier material is a metal oxide.

3. A barrier as recited in claim 1 wherein each crosslinked acrylate layer has a thickness of about 1.2 to 1.5 micrometers.

4. The barrier sheet of claim 1 wherein the acrylate monomer is selected from the group consisting of monoacrylates, diacrylates, triacrylates and tetraacrylates.

5. The barrier sheet of claim 1 wherein the acrylate monomer has a vapor pressure at 25° C. of 1 to 20 micrometers of mercury.

6. The barrier sheet of claim 1 wherein the substrate has been cooled to a temperature in the range from 0 and 15° C. before the first acrylate layer is applied.

7. The barrier sheet of claim 1 wherein the first vapor deposited, crosslinked acrylate layer comprises at least one monomer having a molecular weight in the range of 150 to 600 and an oligomer having a molecular weight of greater than 1000.

8. A barrier sheet of claim 1 wherein the first vapor deposited, crosslinked acrylate layer comprises at least one monomer having a molecular weight in the range of 150 to 600 and a fluorinated acrylate having a molecular weight of about 400 to about 3000.

9. The barrier sheet of claim 8 wherein the fluorinated acrylate is selected from the group consisting of monoacrylates, diacrylates, and methacrylates.

10. A barrier sheet of claim 1 wherein the first vapor deposited, crosslinked acrylate layer comprises at least one chlorinated acrylate monomer.

11. The barrier sheet of claim 1 having an oxygen permeability of about 0.002 ml/100 in$^2$/hour.

12. The barrier sheet of claim 1 wherein an acrylate monomer comprising the first vapor deposited, crosslinked acrylate layer is less polar than an acrylate monomer comprising the second vapor deposited, crosslinked acrylate layer.

13. The barrier sheet of claim 12 wherein the gas barrier layer is a metal.

14. The barrier sheet of claim 1 wherein the gas barrier layer comprises a metal oxide.

15. The barrier sheet of claim 1 wherein the substrate is exposed to one or more of flame-treating, corona-discharge, and plasma-treating prior to monomer deposition.

16. A container comprising:
    a closable hollow container molded from a thermoplastic having an outside surface that has been activated;
    a first vapor deposited, crosslinked acrylate layer on a surface of the container, the outside surface of the container being sufficiently smooth that the acrylate layer is continuous;
    a substantially continuous layer of gas barrier material vacuum deposited over the acrylate layer; and
    a second vapor deposited acrylate layer over the gas barrier layer which was cross linked before the gas barrier material contacted any solid surface.

17. A container as recited in claim 16 wherein the gas barrier material is selected from the group consisting of silicon oxide and aluminum oxide.

18. A container as recited in claim 16 wherein at least one of the crosslinked acrylate layers is a polymerization product of a blend of acrylate monomers comprising at least one monomer having a molecular weight in the range of from 150 to 600.

19. The container as recited in claim 16 wherein the gas barrier material is at least one of metal oxide, metal, and inorganic material.

20. The container of claim 16 further comprising:
    a second substantially continuous layer of gas barrier material vacuum deposited over the second acrylate layer; and
    a third vapor deposited acrylate layer over the second layer of gas barrier material which was crosslinked before the second layer of gas barrier material contacted any solid surface.

21. The container of claim 16 wherein the container has been cooled before the first acrylate layer is applied.

22. The container of claim 16 wherein the outer surface is has been activated by being exposed to flame-treating, plasma-treating, or corona discharge.

23. A barrier sheet comprising:
    a thermoplastic substrate;
    a first vapor deposited, crosslinked acrylate layer on at least one face of the substrate, the acrylate layer being a polymerization product of a blend of acrylate monomers having a weighted average molecular weight in the range of from 200 to 600;
    a substantially continuous layer of gas barrier material vacuum deposited over the acrylate layer; and
    a second vapor deposited acrylate layer over the gas barrier material which was crosslinked before the gas barrier material contacted any solid surface.

24. A barrier sheet comprising:
    a thermoplastic sheet substrate that has been flame-treated;
    a substantially continuous layer of gas barrier material vacuum deposited on the flame-treated surface of the substrate; and
    an evaporated acrylate layer deposited over the gas barrier layer and crosslinked before the gas barrier material contacts any solid surface.

* * * * *